No. 811,278. PATENTED JAN. 30, 1906.
F. W. COY.
ADJUSTABLE CLUTCH CONTROLLED STANDARD.
APPLICATION FILED JULY 25, 1904.
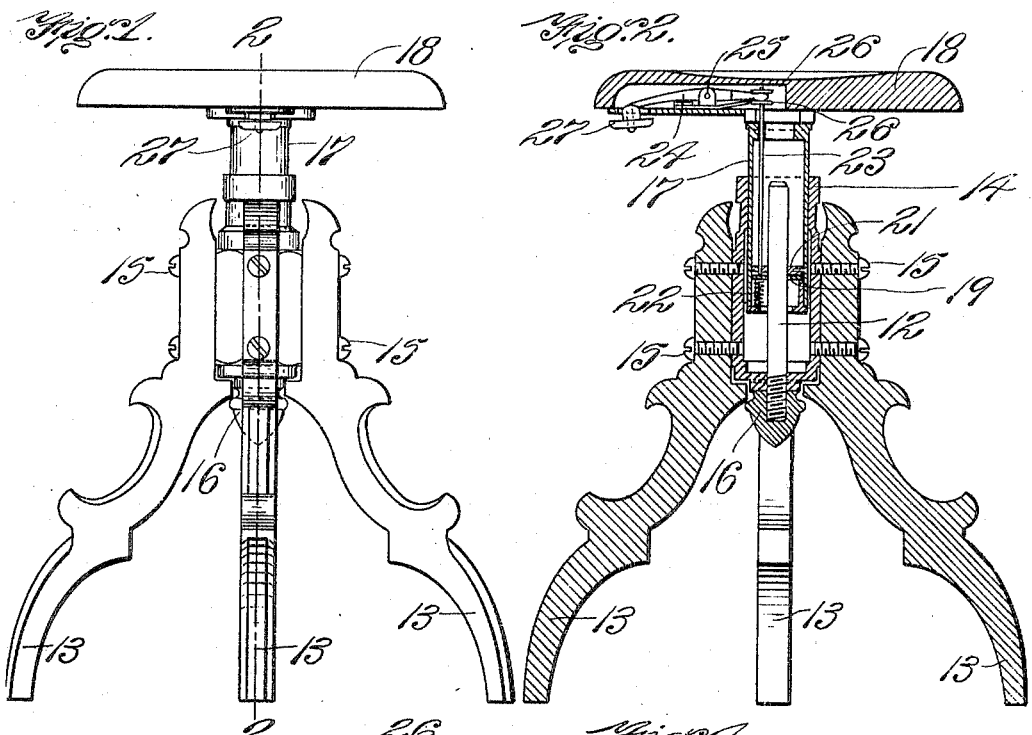
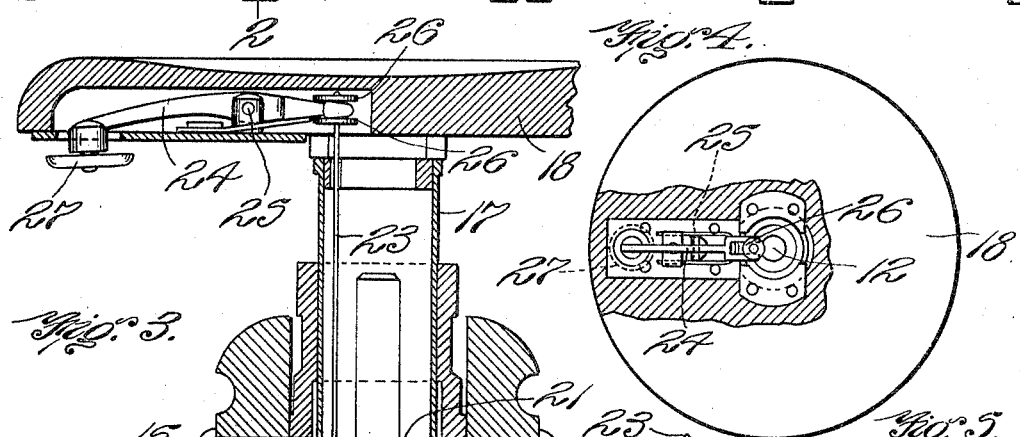
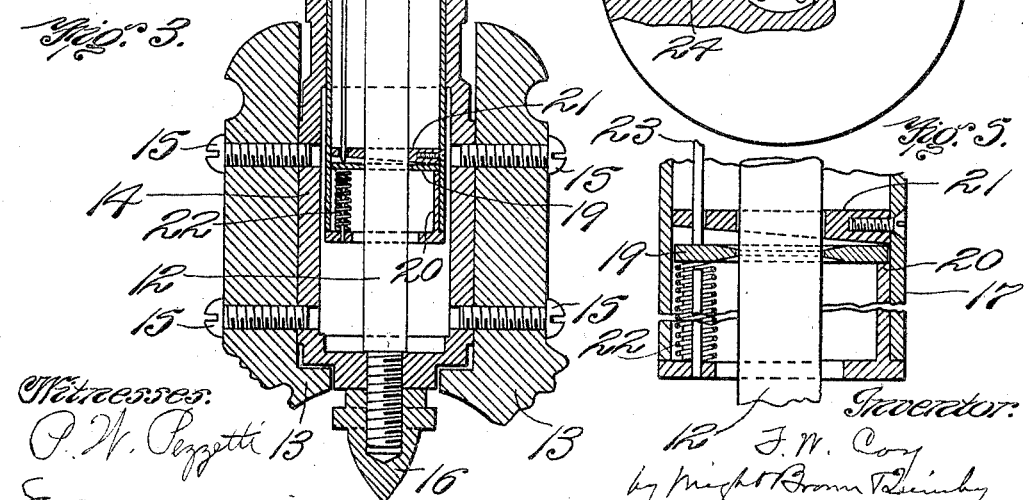

UNITED STATES PATENT OFFICE.

FREDERICK W. COY, OF BOSTON, MASSACHUSETTS, ASSIGNOR TO CHARLES F. BROWN, TRUSTEE, OF READING, MASSACHUSETTS.

ADJUSTABLE CLUTCH-CONTROLLED STANDARD.

No. 811,278.  Specification of Letters Patent.  Patented Jan. 30, 1906.

Application filed July 25, 1904. Serial No. 217,933.

*To all whom it may concern:*

Be it known that I, FREDERICK W. COY, of Boston, in the county of Suffolk and State of Massachusetts, have invented certain new and useful Improvements in Adjustable Clutch-Controlled Standards, of which the following is a specification.

This invention relates to telescopic standards which are adjustable in length and are maintained at any extension to which they may be adjusted by a clutch connected with one member of the standard and adapted to automatically engage the other member, the invention being particularly adapted for piano-stools and other stools or seats which require vertical adjustment.

The invention has for its object to provide a vertical standard adapted to be quickly adjusted as to length or height and to be securely held in any position or at any height for which it may be adjusted.

The invention consists in the improvements which I will now proceed to describe and claim.

Of the accompanying drawings, forming a part of this specification, Figure 1 represents a side elevation of a piano-stool embodying my invention. Fig. 2 represents a section on line 2 2 of Fig. 1. Fig. 3 represents an enlargement of a portion of Fig. 2. Fig. 4 represents a top plan view of the stool shown in Figs. 1 and 2, a portion of the seat being shown in section. Fig. 5 represents an enlargement of a portion of Fig. 3, showing the clutch moved to position to disconnect the two members of the standard.

The same reference characters indicate the same parts in all the figures.

In the drawings, 12 represents a vertical supporting member which is preferably of cylindrical form and is attached to a suitable base, the latter in this embodiment of my invention including diverging legs 13, such as are commonly employed in piano-stools. The member 12 is here shown as screwed at its lower end into the bottom of a tubular socket 14, to which the legs 13 are affixed by screws 15. The lower screw-threaded end of the member 12 projects through and below the bottom of the socket 14 and is engaged below said socket by a nut 16.

17 represents the supported member of my improved standard, the same being preferably of tubular form and having a sliding fit in the socket 14, the latter serving as a guide for the member 17. When the invention is embodied in a piano-stool, a seat 18 is affixed to the upper end of the member 17. Said seat may be considered as a part of the supported member.

19 represents an annular clutch which has a swinging engagement with the supported member 17 and surrounds and is adapted to engage the cylindrical supporting member 12. The orifice surrounded by the clutch 19 is of such size and form that when the clutch is slightly inclined relatively to the axis of the member 12 the clutch is firmly engaged with or grips the member 12, thus rigidly connecting the member 17 with the member 12 and preventing downward movement of the member 17 and seat 18. When the clutch 19 is swung downwardly into a plane at right angles with the axis of the member 12, as shown in Fig. 5, the hold of the clutch on the member 12 is released, so that the member 17 is free to slide downwardly on the member 12. The clutch is normally held in engagement with the member 12 by means of a spring 22, seated on a flange at the lower end of the member 17 and exerting an upward pressure on the clutch near one edge of the latter. The opposite edge of the clutch is seated on a shoulder 20 within the tubular member 17, said shoulder being formed by a tubular bushing inserted in and rigidly secured to the member 17.

21 represents a stop or annular partition, which limits the upward-swinging movement of the clutch 19. Said partition is rigidly affixed to the tubular member 17 and surrounds the member 12. The under side of the partition or stop 21 is inclined, so that the said partition at one side or edge coöperates with the shoulder 20 in confining the corresponding portion of the clutch 19 against vertical movement, the opposite side of the clutch being free to swing vertically. The spring 22 normally holds the clutch in engagement with the member 12, as already stated.

23 represents a rod which is movable vertically in the member 17 and through an orifice in the partition 21, said rod bearing against the clutch 19.

24 represents a lever pivoted at 25 in a recess in the seat 18, one end of said lever being engaged with collars or flanges 26 26, fixed to the rod 23, while the other end of the lever has a push-piece or head 27 projecting below the under side of the seat 18. When the push-piece 27 is pressed upwardly, the rod 23 is pressed downwardly, throwing the clutch out of engagement with the member 12, as indicated in Fig. 5, thus permitting the desired movement of the member 17 and seat 18, supported thereby. When pressure is removed from the head 27, the spring 22 immediately forces the clutch 19 into engagement with the member 12, thus arresting the downward movement of the member 17 and the seat, the latter being supported at any height to which it may have been moved when the pressure on the clutch was released.

It will be seen that the clutch 19 offers no resistance to the independent upward movement of the member 17. Hence the seat may be raised to any desired extent by simply lifting it without operating the lever 24.

The described adjustable standard is particularly useful and desirable in piano-stools, because it permits a quick and easy adjustment of the seat to any desired position. I do not limit myself, however, to the application of my invention to a piano-stool and may embody it in any structure or device to which it is adapted.

I claim—

1. An adjustable clutch-controlled standard comprising a supporting member, a tubular supported member inclosing the supporting member and movable relatively thereto, an annular swinging clutch carried by the tubular member and embracing and normally engaging the supporting member, and means for moving said clutch out of engagement with the supporting member.

2. An adjustable clutch-controlled standard comprising a cylindrical supporting member, a tubular supported member inclosing the supporting member and movable relatively thereto, an annular clutch carried by the tubular member, said clutch embracing the supporting member, a spring which normally holds the clutch in engagement with the supporting member, and means engaged with the clutch for forcing the latter out of engagement with the supporting member.

3. An adjustable clutch-controlled standard comprising a cylindrical supporting member, a tubular supported member movable relatively to the supporting member, an annular clutch seated on a shoulder affixed to the tubular member and carried by the latter, said clutch embracing the supporting member, a spring which normally holds the clutch in engagement with the supporting member, and means including a push-rod carried by the supported member and engaged with the clutch for forcing the latter out of engagement with the supporting member.

4. A piano-stool comprising a cylindrical supporting member having a suitable base, and a vertical guide, a tubular supported member having a seat affixed to its upper end, said member being movable in said guide, an annular clutch seated on a shoulder in the tubular member and embracing the supporting member, a spring which normally holds the clutch in engagement with the supporting member, a clutch-displacing rod movable in the tubular member and engaging the clutch, and an operating-lever pivotally connected with the seat and engaged with the rod.

In testimony whereof I have affixed my signature in presence of two witnesses.

FREDERICK W. COY.

Witnesses:
C. F. BROWN,
E. BATCHELDER.